US009277578B2

(12) United States Patent
Guglielmi et al.

(10) Patent No.: US 9,277,578 B2
(45) Date of Patent: Mar. 1, 2016

(54) ENABLING COMBINATIONAL SERVICES IN A COMMUNICATIONS NETWORK

(75) Inventors: Gianni Guglielmi, Turin (IT); Andrea De Martin, Turin (IT); Bruno Bottiero, Turin (IT); Francesco Baietto, Turin (IT); Luca Bosonetto, Turin (IT); Dario Sestito, Turin (IT); Giorgio Castelli, Turin (IT); Sergio Collesei, Turin (IT)

(73) Assignee: Telecom Italia S.p.A., Milan (IT)

( * ) Notice: Subject to any disclaimer, the term of this patent is extended or adjusted under 35 U.S.C. 154(b) by 1962 days.

(21) Appl. No.: 11/792,093

(22) PCT Filed: Dec. 3, 2004

(86) PCT No.: PCT/IT2004/000674
§ 371 (c)(1),
(2), (4) Date: Dec. 11, 2007

(87) PCT Pub. No.: WO2006/059353
PCT Pub. Date: Jun. 8, 2006

(65) Prior Publication Data
US 2008/0075067 A1 Mar. 27, 2008

(51) Int. Cl.
*H04W 76/02* (2009.01)
*H04M 3/00* (2006.01)
*H04J 3/24* (2006.01)

(52) U.S. Cl.
CPC .................................. *H04W 76/025* (2013.01)

(58) Field of Classification Search
CPC .......................... H04W 76/025; H04W 76/028
See application file for complete search history.

(56) References Cited

U.S. PATENT DOCUMENTS

| 6,142,068 A * | 11/2000 | Sebastian .................. B30B 5/06 100/154 |
| 6,148,068 A * | 11/2000 | Lowery et al. ........... 379/202.01 |
| 6,757,266 B1 | 6/2004 | Hundsheidt |
| 6,760,324 B1 * | 7/2004 | Scott et al. ..................... 370/352 |
| 2002/0114316 A1 * | 8/2002 | Buchanan, Jr. ....... H04J 3/0608 370/350 |
| 2002/0114320 A1 * | 8/2002 | Ogren ........................... 370/352 |
| 2003/0012163 A1 * | 1/2003 | Cafarelli et al. .............. 370/338 |
| 2003/0210683 A1 | 11/2003 | Bais et al. |
| 2003/0214929 A1 * | 11/2003 | Bichot .................... H04L 45/04 370/338 |
| 2004/0001474 A1 * | 1/2004 | Simelius et al. .............. 370/349 |

(Continued)

FOREIGN PATENT DOCUMENTS

| EP | 1 317 108 A1 | 6/2003 | |
| GB | 2408654 A * | 6/2005 | ............... H04Q 7/22 |
| WO | WO 03/003767 A1 | 1/2003 | |

OTHER PUBLICATIONS

European Search Report, from the European Patent Office in related European Application No. EP 10 18 5359, dated Apr. 12, 2011.

(Continued)

*Primary Examiner* — Wutchung Chu
*Assistant Examiner* — Jason Harley
(74) *Attorney, Agent, or Firm* — Finnegan, Henderson, Farabow, Garrett & Dunner, L.L.P.

(57) ABSTRACT

A combinational service is made enjoyable on the terminal of a user of a communication network in a simplified way. The user establishes a call on the circuit domain, and on his/her terminal, menu options are made available related to the enjoyment of the combinational service in consequence of the establishment of such call on the circuit domain.

32 Claims, 6 Drawing Sheets

(56) References Cited

U.S. PATENT DOCUMENTS

2004/0147278 A1* 7/2004 Miramontes .............. 455/550.1
2005/0130645 A1* 6/2005 Albert Dobson ....... H04L 41/00
                                                      455/423

OTHER PUBLICATIONS

Olsson et al.; "Combinational Services—The Pragmatic First Step Toward All-IP", Ericsson Review, No. 2, pp. 66-71, (2003).
Nokia Corporation, A White Paper, http://www.nokia.com/BaseProject/Sites/NOKIA_MAIN_18022/CDA/Categories/Phones/Technologies/VideoSharing/_Content/_Static_Files/video_sharing_a4_2510.pdf, "Video Sharing—Enrich Your Voice Call With Video", XP-002336424, pp. 1-11, (2004).
"White Paper: IP Convergence Based on SIP: Enhanced Person-To-Person Communications", Nokia, http://www.forum.nokia.com/main/1,,040,00.html?fsrParam=2-3-/main.html&fileID=5336, Version 1.0, pp. 1-21, (2004).
"Digital Cellular Telecommunications System (Phase 2+); Universal Mobile Telecommunications System (UMTS); IP Multimedia Subsystem (IMS); Stage 2, (3GPP TS 23.228 Version 5.6.0 Release 5)", ETSI TS 123 228 V5.6.0, pp. 1-128, (Sep. 2002).

* cited by examiner

ENABLING COMBINATIONAL SERVICES IN A COMMUNICATIONS NETWORK

CROSS REFERENCE TO RELATED APPLICATION

This application is a national phase application based on PCT/IT2004/000674, filed Dec. 3, 2004, the content of which is incorporated herein by reference.

FIELD OF THE INVENTION

The present invention relates in general to the field of communications networks, and in particular to mobile communications networks. The present invention relates more particularly to the enjoyment of combinational services by users of communications networks, particularly of mobile communications networks.

BACKGROUND OF THE INVENTION

Mobile telephony networks have initially been conceived for allowing voice communications, in a way similar to the Public Switched Telephone Networks, shortly PSTNs, but between mobile users. The mobile telephony networks have experienced and are experiencing an enormous spread, especially after the introduction of second generation mobile networks, and particularly of digital mobile networks, such as those conforming to the GSM ("Global System for Mobile communications") standard, and to the corresponding systems adopted in the United States and in Japan.

In way similar to the PSTNs, the second generation mobile networks are circuit switched networks; this greatly limits the bandwidth that can be allocated for a given user, especially in mobile networks of the second generation. On the contrary, data communications networks such as computer networks and, among these, the Internet, adopt packet switched schemes, that allow much higher data transfer rates.

Some solutions have been proposed for overcoming the limitations of the traditional circuit switched mobile networks such as the GSM networks, so as to allow the users of mobile terminals to exploit in efficient way the services offered through the Internet. One of the solutions that is acquiring a significant popularity is the GPRS ("General Packet Radio Service"). The GPRS is a digital mobile telephony technology compatible with the GSM networks (actually, it is built on the existing GSM network architecture) that allows data transfer at a higher speed than that allowed by the pure GSM. Essentially, the GPRS can be seen as an add-on to the GSM, that supports and enables packet data communication. Although third generation wireless communications systems such as those conforming to the standard UMTS ("Universal Mobile Telecommunication System") are more promising in terms of data transfer speed, the GPRS is a within reach solution to improve the data exchange capability in existing GSM networks.

The services offered by these mobile networks in addition to the simple vocal communications have quickly increased in number and quality; just to cite some examples, in the last few years short messaging services ("Short Messaging System", shortly SMS) and multimedia messaging services ("Multimedia Messaging System", or MMS), and Internet connectivity services have been made available.

In particular, there is a strong interest in providing multimedia services to the users of mobile communications networks, i.e., services thanks to which there is the possibility of adding images, video, access to data through the Internet or through the electronic mail, to a communication between users that is made of voice alone. Among these services, the so-called "combinational services" are attracting great attention of the mobile telephony operators. For the purposes of the present description, by "combinational service" there is, in general, intended a service through which a terminal of a (not necessarily mobile) communications network can simultaneously open and use two connections, typically a circuit (circuit-switched or CS) connection and a packet (packet-switched, PS) connection.

U. Olsson and M. Nilsson, in the article "Combinational services—The pragmatic first step toward all-IP", Ericsson Review No. 2, 2003, describe, inter alia, an example of so-called "combinational services", in which the ability to simultaneously handle traffic on a circuit connection and on a packet connection is used: the sharing of images during a conversation. The authors notice that the possibility of simultaneously handle traffic on a circuit connection and on a packet connection is allowed both with the WCDMA (Wideband Code Division Multiple Access), giving the possibility to use multiple and parallel bearers in the "over-the-air" interface (multiple Radio Access Bearers, multi-RAB), and with the GSM, in which a standardized mechanism—the Dual Transfer Mode, or DTM—yields similar possibilities. In the article, the authors notice however that the mere technical possibility of "successfully crossing the air" is not enough. Sometimes it is forgotten that the average final user is not interested in the complications of the channels coding and wave propagation. Instead, the final user wants a mobile terminal that is reliable, simple to use, and well adapted to the current context. In other words, some entity in the mobile terminal has to interpret what the user is trying to do and translate it into a sequence of operations. An example described in the article relates to a woman and her husband during a conversation about an extraordinary gardens exposition. During the conversation, the woman decides to show to her husband what she is describing. Ideally, the user interface (Man-Machine Interface or MMI) should be sufficiently simple, in such a way that she only needs to press the key for turning the video camera on. The mobile terminal should contain enough intelligence to discover how to reach the other participant to the call on a packet connection and send the images. According to the authors, in order to let this happen, the following base blocks are necessary:

a coordination function in the mobile terminal (at least, an extended address book with information related to the reachability of all the pertinent networks);

a reachability mechanism in the packet connection part. According to the authors, the long term solution will probably be based on IMS (IP Multimedia Subsystem), using a SIP (Session Initiation Protocol) session protocol to find the other participant and negotiate the session parameters;

a mechanism for distributing informative capability that allows to applications based on the terminals and on the network to make an intelligent use of the information related to the subscription, the session state, the bearer states, user preferences and so on. In this respect, the authors suggest, among the other things, the SIP, the use of the HTTP protocol and the Web XML services.

Another description of a service enjoyable through mobile terminals is given in the White Paper "Video sharing—Enrich your voice call with video", by Nokia Corporation, publicly available for download at the Internet site:

http://www.nokia.com/BaseProject/Sites/NOKIA_
MAIN_18022/CDA/Categories/Phones/Technologies/
VideoSharing/_Content/_Static_Files/video_shar-
ing_a4_2510.pdf The real time video sharing service allows the users, during a telephone conversation, to easily enrich their communication. One or the other of the users can share a live video taken by a video camera or video clips from the terminal. Both the users see the same video and can discuss about it while they are continuing their voice call. In an example described in the White Paper, Keith and Malcom are in a normal call on a circuit connection (CS) and Keith wants to share live video with Malcom. They both have devices capable of video sharing and are registered for the service. The following flow is described in the White Paper:

During the ongoing CS voice call, Keith chooses to share the live video.
Keith confirms Malcom as a recipient.
Malcom receives video request from Keith and accepts it.
The system shows the acceptance to Keith, who activates the sending of the video stream.
Malcom's device starts showing the same video as Keith's device. They can discuss it via the voice call.
Keith ends the video sharing when he has shown what he wanted. The voice call between Keith and Malcom remains active.

The technology used by the video sharing service described by the above-mentioned White Paper is the general SIP or IMS infrastructure.

In another White Paper, entitled "White Paper: IP Convergence Based On SIP: Enhanced Person-To-Person Communications", publicly made available by Forum Nokia for download at the Internet site http://www.forum.nokia.com/main/1,040,00.html?fsr-
Param=2-3-/main.html&fileID=5336 the use of the SIP protocol is described for the establishment of peer-to-peer connections type between terminals capable of supporting the IP protocol. As described in the White Paper, in order to communicate, IP-based applications must have a mechanism to reach the correspondent. Today, fixed and mobile telephony networks perform this critical task of establishing a connection. By dialing the other user's telephone number, the network can establish an ad-hoc connection between any two terminals. This critical connectivity capability still does not exist widely in the Internet. According to this White Paper, SIP-based sessions management, complemented by other critical mobile networks capabilities (i.e., authentication, roaming, and network interconnection provided by the IMS standard) provides the required structure. With the implementation of such a system, it is possible to establish an IP connection between two terminals. Once the connection is established, it can be used to exchange all types of communication media (voice, video, content, etc.). Like HTTP, SIP is a text-based client-server protocol. SIP was designed to establish, modify and terminate multimedia sessions or calls, and it differs from the HTTP in the fact that a "SIP terminal" (or User Agent, UA) may act as both a client and a server. Therefore it is possible to establish a client-to-client communication. The version 6 of the IP protocol (IPv6) provides, according to this White Paper, a robust base for the SIP-based services. The most important benefit of IPv6 is the large address space. In fact, a problem also underlined in this White Paper is that the version 4 of the protocol IP (IPv4) and that such protocol has been designed for a smaller number of Internet hosts, compared to what the Internet is experimenting today. The problem of the address space will become even greater when hundreds of million (or billions) of cellular handsets will be connected to the Internet. Among the possible applications of the SIP protocol described in this White Paper, the real time video sharing service is cited.

SUMMARY OF THE INVENTION

The Applicant observes that the solutions proposed above for the implementation of combinational services, based on the SIP-IMS infrastructure, are not free of problems.

A first problem observed by the Applicant is in the fact that the SIP-IMS infrastructure requires a great number of available IP addresses to the network operator, since every SIP terminal "consumes" an IP address, typically for the whole time during which it stays turned on. In the future, such problem will be resolved with the spread use of IPv6, in place of the currently used IPv4: the Applicant thinks however desirable the implementation of combinational services that can be enjoyed by an elevated number of users also through IPv4 addresses, in such a way to make such services available in brief time.

A second problem observed by the Applicant is in the fact that the use of such services can result complicated for the average final user, who typically simply uses his/her own terminal to place phone calls, or to send messages of the SMS (Short Message Service) type. Particularly, the Applicant observes that combinational services of the video-sharing or image-sharing type, in which two users of a communication network can exchange still images or video (clips recorded or taken in real time by an embedded videocamera) during a voice call, can result rather complex to be used in case a lot of interactions with their own terminals are required to the users. For this reason, the enjoyment of combinational services, that gives different simultaneous possibilities of communication to the user, should be made as simplest and efficient as possible, so as to minimize configuration requests of the terminal and complications of use. This would allow a strong diffusion of the combinational services.

A third problem observed by the Applicant is in the fact that the use of the SIP-IMS structure, if from one hand allows great versatility of use (particularly for users registered in different types of network, e.g. fixed-mobile), from the other hand requires mechanisms of search of the registered users and of messages forwarding toward the clients resident on the terminals of the users, that can slow down the enabling of the packet connection between two users already engaged in a circuit call, i.e. the enabling of the combinational service between the two users. The Applicant believes therefore that it may result convenient to simplify the protocol of messages necessary for enabling the connection on the packet domain, so as to make such enabling faster.

Concerning the second and the third problems exposed above, the Applicant observes that in a combinational service in which two users have to be enabled to be able to exchange video or images on a packet connection, in addition to colloquiate on a normal circuit connection, some information necessary to establish the connection on the packet domain can be derived by the communications network by the fact that a circuit connection is already established between the two. This allows simplifying the protocol necessary to enable the packet connection, reducing the number of signaling messages and the interactions of the users with their own terminals.

In a first aspect, the invention relates to a combinational service that is made enjoyable on a user's terminal in simplified way. The user establishes a call on the circuit domain and on his/her terminal menu options are made available related to the enjoyment of the combinational service in consequence of the establishment of such call.

In a second aspect, the invention relates to a method for enabling the use of at least one combinational service in at least a first terminal of a first user of a communication network. The method comprises the establishment of a first connection in a circuit domain of said communication network, from said first terminal to a second terminal of a second user of said communication network; the reception, at said first terminal, of an acknowledgement of the establishment of said first connection; and the automatic establishment of a second connection from said first terminal toward a packet domain of said communication network, in consequence of the reception of said acknowledgement.

In a third aspect, the invention relates to an application adapted to be installed on a first terminal of a first user of a communication network, to enable the use of at least one combinational service in said first terminal. The application comprises portions of software code adapted to receive an acknowledgement related to the establishment of a first connection in a circuit domain of said communication network from said first terminal to a second terminal of a second user of said communication network, and to automatically establish a second connection from said first terminal toward a packet domain of said communication network, in consequence of the reception of said acknowledgement.

In a fourth aspect, the invention relates to a terminal adapted to the use in a mobile communication network. The mobile terminal, for example a cellular phone, comprises modules adapted to receive an acknowledgement related to the establishment of a first connection in a circuit domain of said communication network from said first terminal to a second terminal of a second user of said communication network, and to automatically establish a second connection from said first terminal toward a packet domain of said communication network, in consequence of the reception of said acknowledgement.

In a fifth aspect, the invention relates to a method for enabling a first and a second terminal of a communication network to the use of a combinational service. Said first and said second terminals are connected to each other through a first connection established on a circuit domain of said communication network, and they have respectively associated a first and a second identifier in said circuit domain of said communication network. In addition, said first and said second terminal have respectively associated a first and a second address in a packet domain of said communication network. The method comprises, in a first apparatus included in said packet domain of said communication network:

receiving a first request from said first terminal, said first request including said first address and said second identifier;

associating said first address to said first identifier of said first terminal;

receiving a second request from said second terminal, said second request including said second address and said first identifier;

associating said second address to said second identifier of said second terminal;

enabling the establishment of a second connection on said packet domain of said communication network between said first and said second terminal based on said association between said first address and said first identifier and of said association between said second address and said second identifier.

In a sixth aspect, the invention relates to a software program adapted to be installed in a first apparatus included in a packet domain of a communication network, to enable a first and a second terminal of said communication network to the use of a combinational service, in which said first and said second terminal are connected to each other through a first connection established on a circuit domain of said communication network. Said first and said second terminal have respectively associated a first and a second identifier in said circuit domain of said communication network. Additionally, said first and said second terminals have respectively associated a first and a second address in said packet domain of said communication network. The program comprises portions of software code adapted to:

receiving a first request from said first terminal, said first request including said first address and said second identifier;

associating said first address to said first identifier of said first terminal;

receiving a second request from said second terminal, said second request including said second address and said first identifier;

associating said second address to said second identifier of said second terminal;

enabling the establishment of a second connection on said packet domain of said communication network between said first and said second terminal based on said association between said first address and said first identifier and of said association between said second address and said second identifier.

In a seventh aspect, the invention relates to a method for enabling a first and a second terminal of a communication network to the use of a combinational service. The method comprises:

establishing a first connection in a circuit domain of said communication network between said first terminal and said second terminal;

receiving, at said first and at said second terminals, an acknowledgement of the establishment of said first connection;

automatically connecting said first and said second terminals to a packet domain of said communication network, in consequence of the reception of said acknowledgement;

assigning to said first and second terminals a first and, respectively, a second addresses in said packet domain of said communication network, said first and said second addresses being respectively associated with a first and to a second identifiers of said first and said second terminals in said circuit domain of said communication network;

automatically sending a first request from said first terminal to an apparatus included in said packet domain of said communication network, said first request including said first address and said second identifier, in consequence of the reception of said first address;

automatically sending a second request from said second terminal to said apparatus, said second request including said second address and said first identifier, in consequence of the reception of said second address;

enabling the establishment of a second connection on said packet domain of said communication network between said first and said second terminals, based on a first association between said first identifier and said first address and of a second association between said second identifier and said second address, said first and said second associations being performed by said apparatus in consequence of the reception of said first and said second requests.

DETAILED DESCRIPTION OF THE INVENTION

Figure 1:
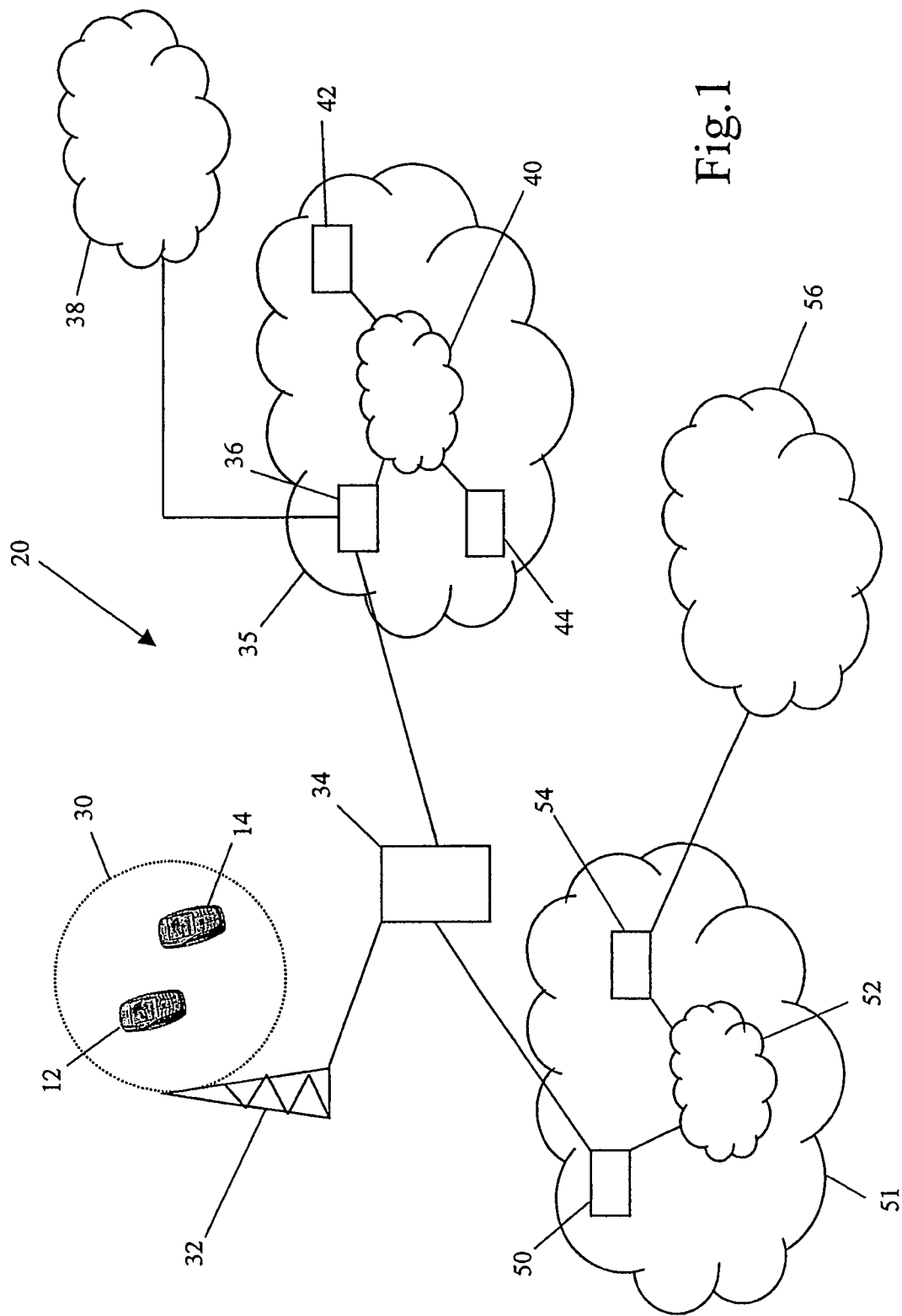
FIG. 1 shows, by way of example, a mobile communication network capable of supporting a combinational service.

FIG. 1 shows an example of mobile communication network 20 capable of providing mobile telephony services according to the GSM/GPRS standard. It is observed that a mobile network capable of providing mobile telephony services according to the UMTS standard has a structure very similar to the mobile network shown in FIG. 1. The mobile network 20 supports both communications on circuit connections, and communications on packet connections. To such end, the mobile network 20 includes a circuit network portion (or domain) 35 and a packet network portion (or domain) 51. Mobile terminals 12, 14 (for instance cellular phones, PDAs or Personal Digital Assistants, etc.) communicate on a radio interface with one or more radio base stations (BTS, Base Transmitter Station) 32. Every base radio station 32 provides mobile telephony services in a correspondent geographical area 30 commonly known under the name of "cell". It is to be understood that the mobile network 20 provides services to a number of cells and to a number of mobile terminals much higher than those shown by way of example in FIG. 1. Different radio base stations 32 are connected to a Base Station Controller (BSC) 34, that manages the allocation and the de-allocation of the radio resources and controls the handovers of the mobile terminals in the passage from a radio base station to another. A BSC and his associated radio base stations are typically referred to as a Base Station Subsystem (BSS). The BSC 34 is connected to a Mobile Switching Center (MSC) 36 in the circuit domain 35, through which the circuit connections can also be established toward other networks 38, such as for instance PSTN or ISDN (Integrated Services Digital Network) networks. Typically, in capillary mobile networks, a plurality of BSCs like the BSC 34 shown in FIG. 1, are connected to a single MSC.

The MSC 36 is also connected, through a signaling network 40 (for instance a signaling network according to the Signaling System No. 7 or SS7) to a Home Location Register (HLR) 42, and to a Visitor Location Register (VLR) 44. The VLR 44 include a database containing information related to all the mobile terminals instantly present in a correspondent geographical area, as well as it holds temporary registration data of subscribers of the mobile telephony service, necessary to the MSC to provide services in such geographical area. The HLR 42 includes a database that stores and manages the subscriptions of the users of the mobile network 20, such as for instance the users to which the mobile terminals 12, 14 belong. For every subscriber thereof, the HLR contains permanent subscription data, such as for instance the telephone number (Mobile Station ISDN or MSISDN), also known as Client Line Identifier (CLI), that identifies the subscription of the mobile terminal in the numeration plan of the PSTN network and an international mobile subscriber identifier (IMSI), i.e. an unique identifier at the international level allocated to every subscriber and used for the signaling in the circuit domain of the mobile networks. The HLR 42 additionally contains a list of services that a subscriber of a mobile network is authorized to use (in a so-called "profile"), and the address of the VLR that is instantly serving such subscriber.

Every BSC 34 is also connected to the packet domain, corresponding to the GPRS network 51 in FIG. 1, to a Serving GPRS Support Node (SGSN) 50, that is responsible of the delivery of the packets to the mobile terminals that are located in its service area. In capillary mobile networks, a plurality of BSCs is connected to a single SGSN. A Gateway GPRS Support Node (GGSN) 54 acts as logical interface toward external packet networks, such as for instance the IP network 56 (for example, the Internet). The nodes SGSN 50 and GGSN 54 are typically connected to each other by an IP backbone 52.

The mobile communication network 20 of FIG. 1 is therefore part of a wider communication network, that involves external circuit networks (exemplified by the network 38), and external packet networks (exemplified by the network 56). The users of the mobile communication network 20 can communicate with users belonging to the external network 38 on a circuit connection, as well as be connected to a web site or to their own electronic mail server in the IP network 56 on a packet connection. Additionally, the users of the mobile communication network 20 can use at least one combinational service, i.e. a service thanks to which a user, for instance the user to which the mobile terminal 12 of FIG. 2 belongs, can simultaneously open, from his/her own mobile terminal 12, a circuit connection and a packet connection toward another user (of the mobile network 20 or of the external network 38). The user can for instance check, from his mobile terminal 12, one or more web pages, exploiting the packet connection, and at the same time discuss the content of such page(s) with his/her own interlocutor exploiting the circuit connection. In another example, the user can download on his/her mobile terminal 12 the content of his/her own electronic mail box, exploiting the packet connection, and at the same time discuss of the content of one or more electronic mail messages received with his/her own interlocutor exploiting the circuit connection. In another example, the user can send a series of still images or a video (a clip recorded or taken in real time through an embedded videocamera) from his/her own mobile terminal 12 to the terminal of his/her own interlocutor, exploiting the packet connection, and at the same time comment together with his/her own interlocutor the images that appear on both the terminals. For the purposes of the present invention, it will be intended in the following that the term "video" is meant to include whatever type of image, both still and in movement, taken in real time or recorded and stored in a memory area.

Figure 2:
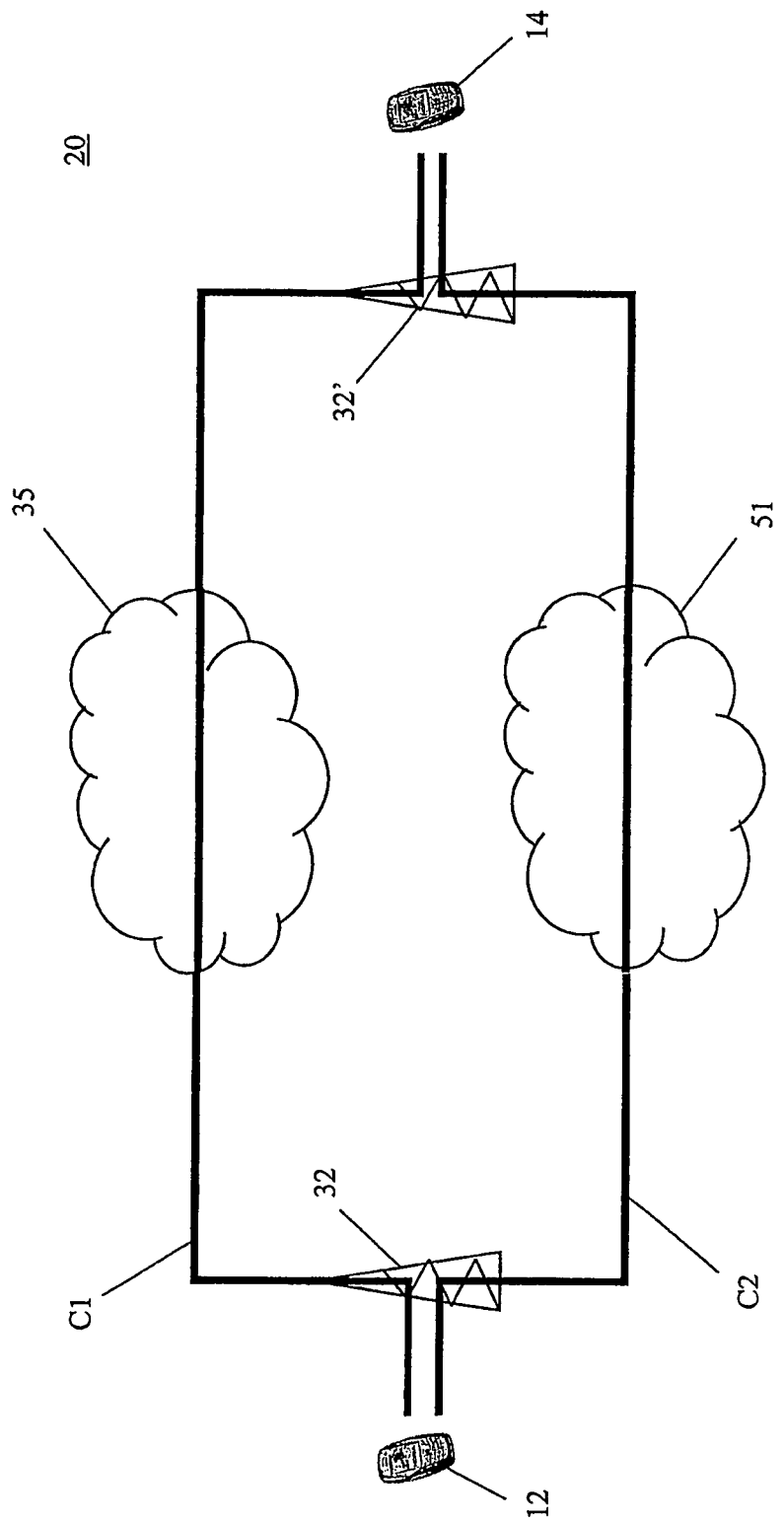
FIG. 2 shows in schematic way the enjoyment of a combinational service by two users of a mobile communication network.

For instance, with reference to FIG. 2, a first user of the mobile network 20, to which the mobile terminal 12 belongs, places a call toward a second user of the mobile network 20, to which the mobile terminal 14 belongs. The first mobile terminal 12 is served by a BTS 32 and the second mobile terminal 14 is served by a BTS 32', which can be the same one that is serving the first mobile terminal 32 or a different one. A first connection C1 is established, at the acceptance of the call by the second user, to support the voice communication between the first and the second users. The connection C1 is typically established, in bidirectional way, in the circuit domain 35 of the mobile network 20. A second connection C2 is established between the mobile terminal 12 and the mobile terminal 14, in the packet domain 51 of the mobile network 20, to allow the first and the second user share some video during their telephone conversation. The connection C2 can be established in unidirectional or bidirectional way: higher bit-rates can be achieved through connections of the unidirectional type. Known technologies can be exploited for allowing the mobile terminals 12, 14 simultaneously maintain the two connections C1 and C2 active: for instance, the already cited multi-RAB technologies for mobile terminals of the third generation, and the DTM technology for mobile terminals of the second generation.

Figure 3:
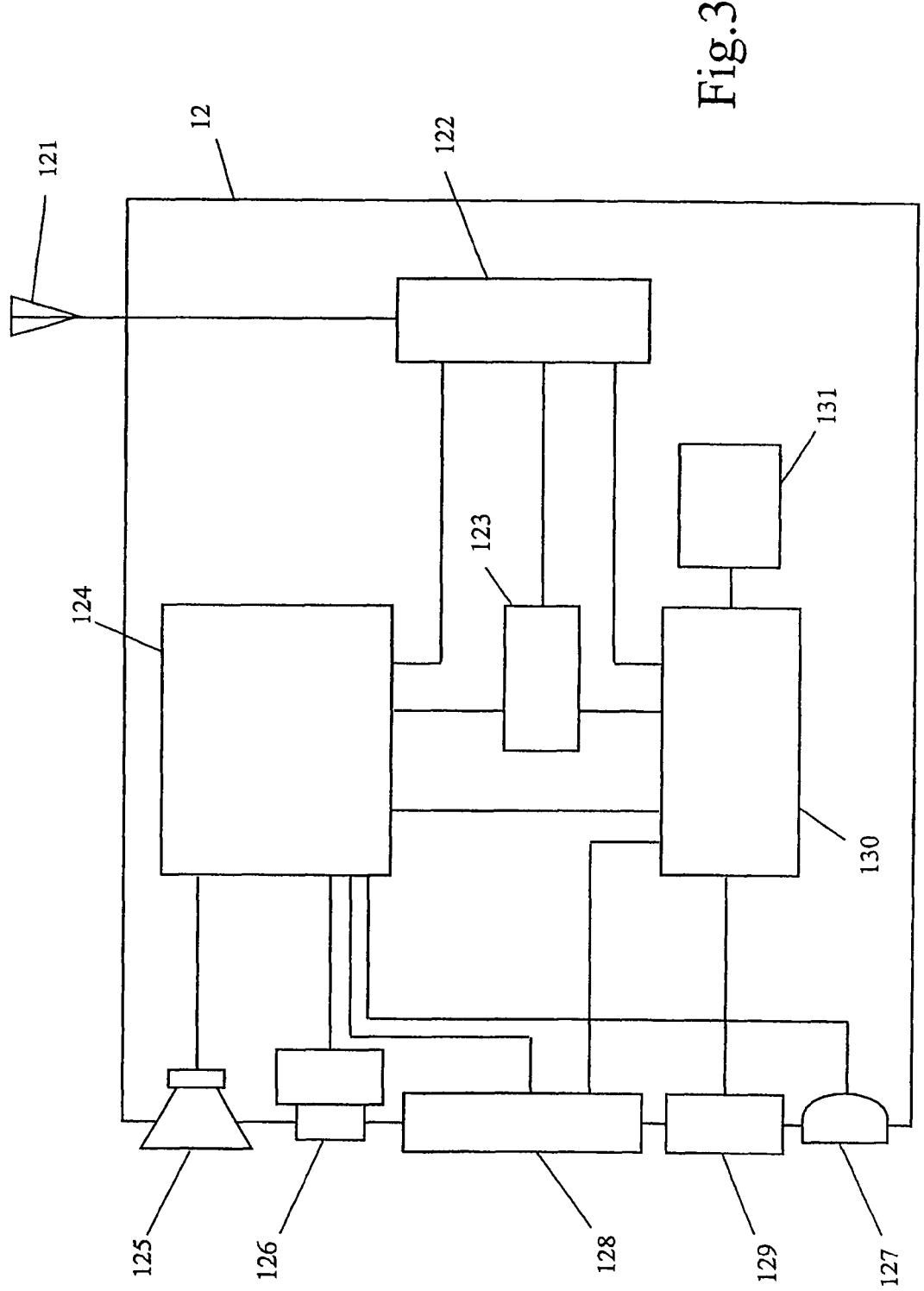
FIG. 3 shows in schematic way and in terms of functional blocks an example of a mobile terminal capable of using a combinational service.

FIG. 3 shows, in schematic way and in terms of functional blocks, an example of mobile terminal 12 capable of using a combinational service. The mobile terminal 12 comprises an antenna 121 adapted to the transmission/reception, a radio-frequency transceiver 122, a GPRS module 123, an encoding/decoding unit 124, a loudspeaker 125, a video camera 126, a microphone 127, a screen 128, a keyboard 129, a processor (or CPU, Central Processing Unit) 130 with a memory 131 associated therewith. The mobile terminal 12 is typically associated with a SIM (Subscriber Identity Module), not shown in FIG. 3, through suitable electrical contacts.

The antenna 121 and the radio-frequency transceiver 122 conventionally allow the communication from and toward the radio base stations of the mobile network. The loudspeaker 125 and the microphone 127 conventionally transform an electrical signal corresponding to the voice in a signal audible by a user of the mobile terminal 12, and vice versa. The keyboard 129 conventionally allows the user to manually interact with the mobile terminal, to send commands related, for instance, to choosing a menu option, or to the selection of a telephone number, etc. The screen 128 can be, for instance, a liquid crystal screen (LCD, Liquid Crystal Display), and it is conventionally adapted to show a video. The video camera 126, for instance a CCD (Charge-Coupled Device) camera, is conventionally adapted to capture a video. The GPRS module 123 conventionally includes a packetizing/depacketizing device and a buffer, and it is capable of encapsulating in packets the radio blocks coming from the mobile network, or to unpack in radio blocks the packets provided by the upper protocol layers, for the transmission toward the mobile network, through the radio-frequency transceiver 122 and the antenna 121. The encoding/decoding unit 124 (for instance an H.263 video codec) is connected to the loudspeaker 125, to the microphone 127, to the display 128 and to the video camera 126: it conventionally manages the coding/decoding of the video captured by the video camera 126 or to be displayed on the screen 128, and/or the audio component captured by the microphone 127 or to be transmitted to the loudspeaker 125. The processor 130 supervisions the operation and the activities of the different modules included in the mobile terminal 12. The memory 131, in combination with the processor 130, includes software applications for managing the communication. Particularly, according to an aspect of the present invention, the memory 131 includes an application software for the control and the management of the at least one combinational service. It is additionally observed that despite in FIG. 3 the encoding/decoding 124 unit is shown as a separate entity, it can also be realized by means of a software program resident in the memory 131 of the mobile terminal 12.

As mentioned above, according to an aspect of the present invention, on the mobile terminal of a user enabled to the use of a combinational service a software application is installed for the control and the management of the combinational service. Such a software application can be implemented as a separate client application, that can be installed on the operating system of the mobile terminal, or "cabled" in the firmware of the mobile terminal. Particularly, the software application includes modules configured to control the establishment of the connections from the mobile terminal toward the circuit domain and toward the packet domain. The software application can be automatically started at the mobile terminal start-up. It can however be provided that the user can disable the automatic start of the application, or that the application is manually executed by the user. Preferably, the software application operates in background so as to practically result "invisible" to the user during the normal use of the mobile terminal. Once in execution, the software application is able to recognize the signalings of events related to calls performed from and/or toward the mobile terminal. Particularly, the application is able to recognize at least:

a signaling related to an incoming call established in the circuit domain; and/or a signaling related to an established outgoing call effected in the circuit domain; and/or a signaling related to the interruption of an ongoing call in the circuit domain, performed locally; and/or a signaling related to the interruption of an ongoing call in the circuit domain, performed remotely.

It is observed that the last two cases listed above also include the possibility that the call is terminated in case the mobile terminal (or a remote mobile terminal) happens to be out of radio coverage during the call. Moreover, it is observed that the cases listed above do not constitute an exhaustive list of possible events that the software application can recognize.

In case the user to which the mobile terminal belongs desires to make a call toward another user (belonging to the same mobile network or to a different, fixed or mobile network), the software application does not intervene during the conventional selection of the telephone number of the user to call (typically performed through the keyboard or selected from a telephone directory stored in the mobile terminal, or in the SIM associated thereto). The calling user can start the call toward his/her own interlocutor in an entirely conventional way, typically pressing a suitable key on the keyboard of the mobile terminal. The call is conventionally routed on the circuit domain.

At the answer of the called user, in the circuit domain of the communication network a connection is established between the mobile terminal of the calling user and the terminal of the called user. At the establishment of such a connection, an acknowledgment is sent to the mobile terminal of the calling user, which enables the calling user to use the connection just established for communicating with his/her own interlocutor. The software application intercepts such an acknowledgment signaling and automatically (i.e., without interaction of the user with the terminal) starts a connection procedure on the packet domain of the mobile network. Typically, the procedure provides for a connection to an access point (APN, Access Point Name) of the packet domain. The connection procedure provides that the GGSN 54 signals to the APN, typically through the RADIUS protocol, the telephone number of the terminal that is requesting the connection. The APN associates to the telephone number a unique address on the packet domain (typically an IP address), after having checked its credentials, and communicates the same to the GGSN 54, which in turn forwards the same toward the terminal that has requested the connection. The APN also keeps the association between the telephone number of the mobile terminal (or the identifier of the mobile terminal in the circuit domain) and the assigned IP address (or the address of the mobile terminal in the packet domain), in a suitable database. Such an association can also be communicated to other apparatuses in the network, such as for instance a WAP Gateway. The connection to the packet domain is typically completed with the opening of a PDP context from the mobile terminal toward a SGSN and a GGSN of the GPRS network core of the mobile network.

Once also the packet connection has been established, the calling user has available the circuit connection to conventionally communicate by voice with his/her own interlocutor, and a packet connection to simultaneously access data services. In other words, the calling user is enabled to the use of at least one combinational service. For instance, the calling user can check from its mobile terminal one or more web pages, exploiting the packet connection, and at the same time he/she can discuss of the content of such page(s) with his/her own interlocutor exploiting the circuit connection. In another example, the user can download onto his/her mobile terminal the content of his/her own electronic mailbox, exploiting the packet connection, and at the same time he/she can discuss of the content of one or more of the electronic mail messages received with his/her own interlocutor, exploiting the circuit connection. If also the terminal of the called user is connected to the packet network (or typically it possesses an IP address), a peer-to-peer connection between the terminals of the two users can be established on the packet domain, to allow the calling user send/receive video calls toward/from the called user, and at the same time he/she can comment together with his/her own interlocutor the images that appear on both the terminals. To establish the peer-to-peer connection, the terminals of the two users exchange their own addresses on the packet domain (typically their IP addresses). In order to perform such an exchange, the software application in execution on the terminal of at least one of the two users is able, for instance, to command the delivery of a message addressed toward the terminal of the remote user, containing its IP address. Such a message can be, for instance, an SMS (Short Message Service) or USSD (Unstructured Supplementary Service Data) message type. A preferred mechanism of establishment of the peer-to-peer connection will be presented subsequently in the present description.

In order to make the service enjoyable, after the establishment of the packet connection, the software application typically makes available on the terminal one or more menu options for the use of the particular data service(s) available through the packet connection. Typically, such menu options can be made activatable by the software application through suitable keys (or softkeys) on the keyboard. For instance, in the case of simple web browsing or mail download, the related menu option can be made available at the reception of the IP address coming from the APN. In the case of video sharing with the remote user, it can be convenient to activate the related menu option after the reception of an acknowledgment, for instance coming from the remote user, of the establishment of the peer-to-peer connection, and/or of the ability of the remote user to use the combinational service. Among the menu options made available for a video sharing combinational service, there may be, for instance, an option for starting the delivery of the video, and/or an option for interrupting the video delivery, and/or a video pause (or image freeze) option. Particularly, in the case of an image freeze and/or of interruption of the video delivery, it can result convenient to cause the last image (or frame) taken by the video camera and coded by the encoding unit in the instant preceding the interruption of the video capture stay available on the terminal of the two users. In fact, such last image can result of better quality on the terminal receiving the video, in comparison to the general quality of the transmitted video: this depends on the fact that the coding of a still image results more efficient, since substantially no interpolations on the frames are performed for deriving every subsequent frame (since the image is always in practice the same one).

The procedure for enabling the use of the combinational service, described above with reference to the execution of a call from the user, can be applied, with few changes, also in the case the user receives an incoming call to his/her own terminal. In this case, the activation procedure of the connection on the packet domain can be triggered by the signaling of the call establishment coming from the network, that is communicated after the acceptance of the external call by the user, typically through the pressure of a suitable key on the keyboard of the terminal.

When the calling user or the called user decide to terminate the voice call on the circuit domain, one of the two users terminates the call, typically through the pressure of a suitable key on his/her own terminal. The connection on the circuit domain is thus dropped. Preferably, upon reception of the acknowledgment of the drop of the connection on the circuit domain, the resident software application on the mobile terminal of the user enabled to the combinational service automatically commands the drop of the connection on the packet domain. Besides, the menu option(s) related to the combinational service(s) is disabled by the software application. The same procedure can also be applied in case of termination of the call on the circuit domain for lack of radio coverage (in case of use of mobile terminals). The mobile terminal returns therefore to its normal standby state, ready to receive or to perform calls (and with the software application managing the enablement to the use of the combinational services in execution in background).

The above described procedure of establishment of the two connections, circuit and packet, and of enablement to the use of combinational services, has several advantages. First of all, such enablement takes place in a way entirely transparent to the user, who in practice effects or accepts a call on the circuit domain in a totally conventional way, finding his/her own terminal also configured for the use of the packet connection when the call is successfully established. Besides, the fact that the packet connection is open in practice only during the voice call allows to potentially make available combinational services to a high number of users, without the necessity of exploiting a packet network in which the IPv6 protocol is implemented, and without the necessity, from the viewpoint of a network operator, to have available pools of IP addresses of significant size, in case addresses according to the protocol IPv4 are used. In fact, the addresses on the packet domain are assigned only after the voice call has been established, and they are preferably released at the end of the same call.

To further avoid "wasting" of IP addresses, the software application managing the combinational service can be configured in such a way as not to trigger the connection procedure to the packet network in some particular cases of circuit calls. For instance, in the case the application software only enables to the use of a combinational service in which two users can exchange some video, the connection procedure to the packet network can be disabled in case of calls effected to or received by particular numerations: for instance, during calls to toll-free numbers, or during calls to numerations corresponding to information services and/or telephone answering system services, or during calls from and toward foreign numerations (in the case such service is not made available during the communication with users resident abroad), or during calls from and toward users belonging to networks of other operators or using different technologies (or for "mixed" calls from fixed to mobile or vice versa), etc. The configuration of the software application to exclude the opening of the packet connection in these particular cases can be updated through typical over-the-air operations. Additionally, especially in the case the delivery of video to a mobile terminal is made available within a combinational service, it can result convenient not to trigger the procedure of connection to the packet network in the case the quality or the intensity of the radio signal are below a certain critical threshold. The same consideration also holds in the case the service is made available only on third generation networks (3G, for instance UMTS), and there is not enough 3G coverage (but however coverage is guaranteed by a second generation network, for instance GSM/GPRS, to perform normal voice calls).

Figure 4:
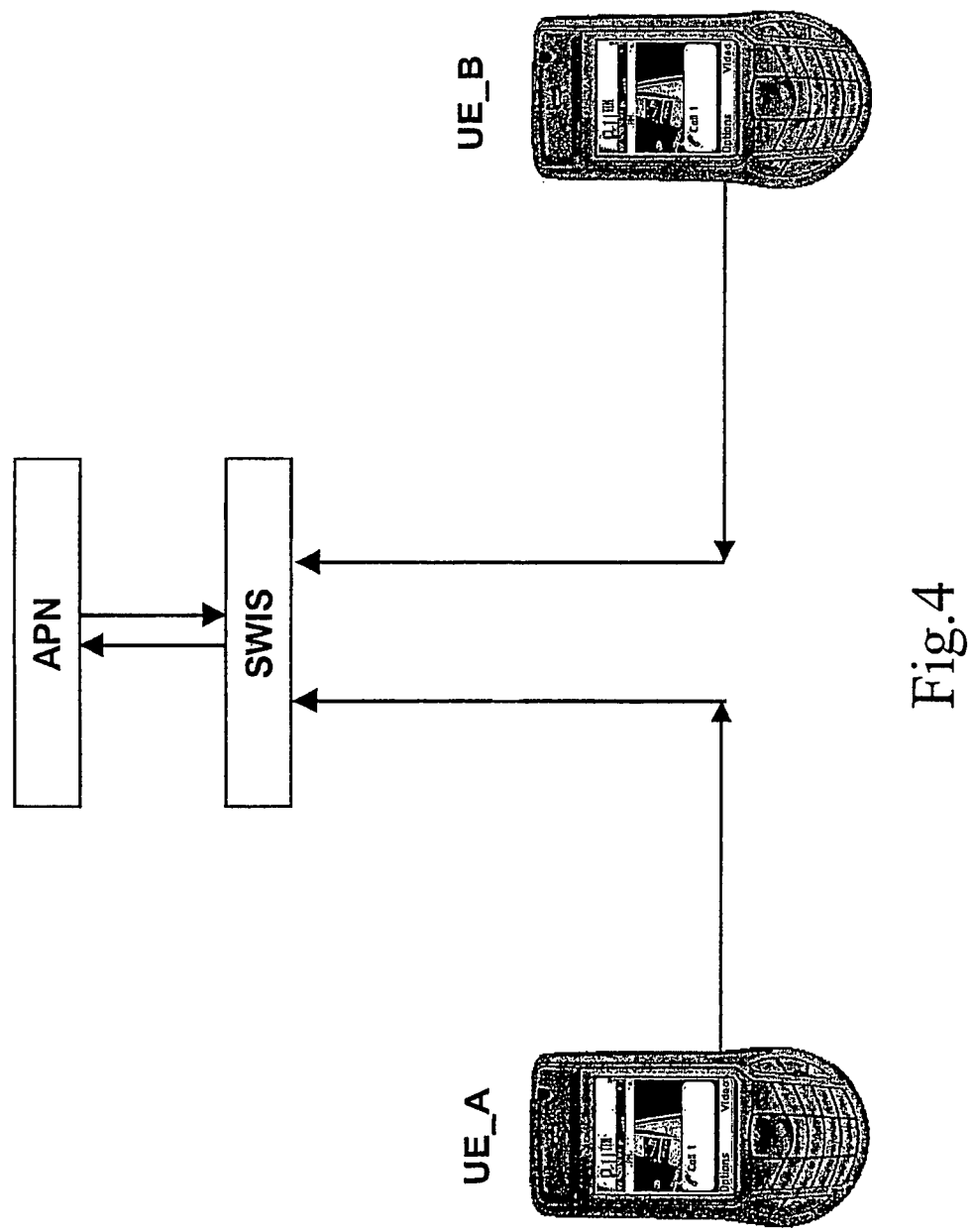
FIG. 4 shows, in extremely simplified way, an architecture for the enjoyment of a combinational service of the type "video sharing" by two users of a mobile communication network.

In the following description, by way of example, a preferred embodiment of a combinational service between two users User_A, User_B of a mobile communication network will be presented in detail, according to an aspect of the present invention. The users User_A and User_B are provided with a mobile terminal UE_A and UE_B, respectively. The combinational service is, for example, a service of the type "See What I See" (SWIS) or "video sharing", i.e. a service in which the User_A and the User_B can exchange video taken by a video camera incorporated in their own mobile terminals UE_A and UE_B through a peer-to-peer connection type on the packet domain, during a normal telephone conversation established in the circuit domain. The service is made possible and managed by an apparatus included in the packet domain of the mobile communication network, denoted by "SWIS" in FIG. 4 (hereinafter, "SWIS server"), connected to an APN of access to the packet domain of the mobile communication network, with which the mobile terminals UE_A and UE_B are able to communicate. FIG. 4 shows a very general scheme of the above described architecture.

Figure 5:
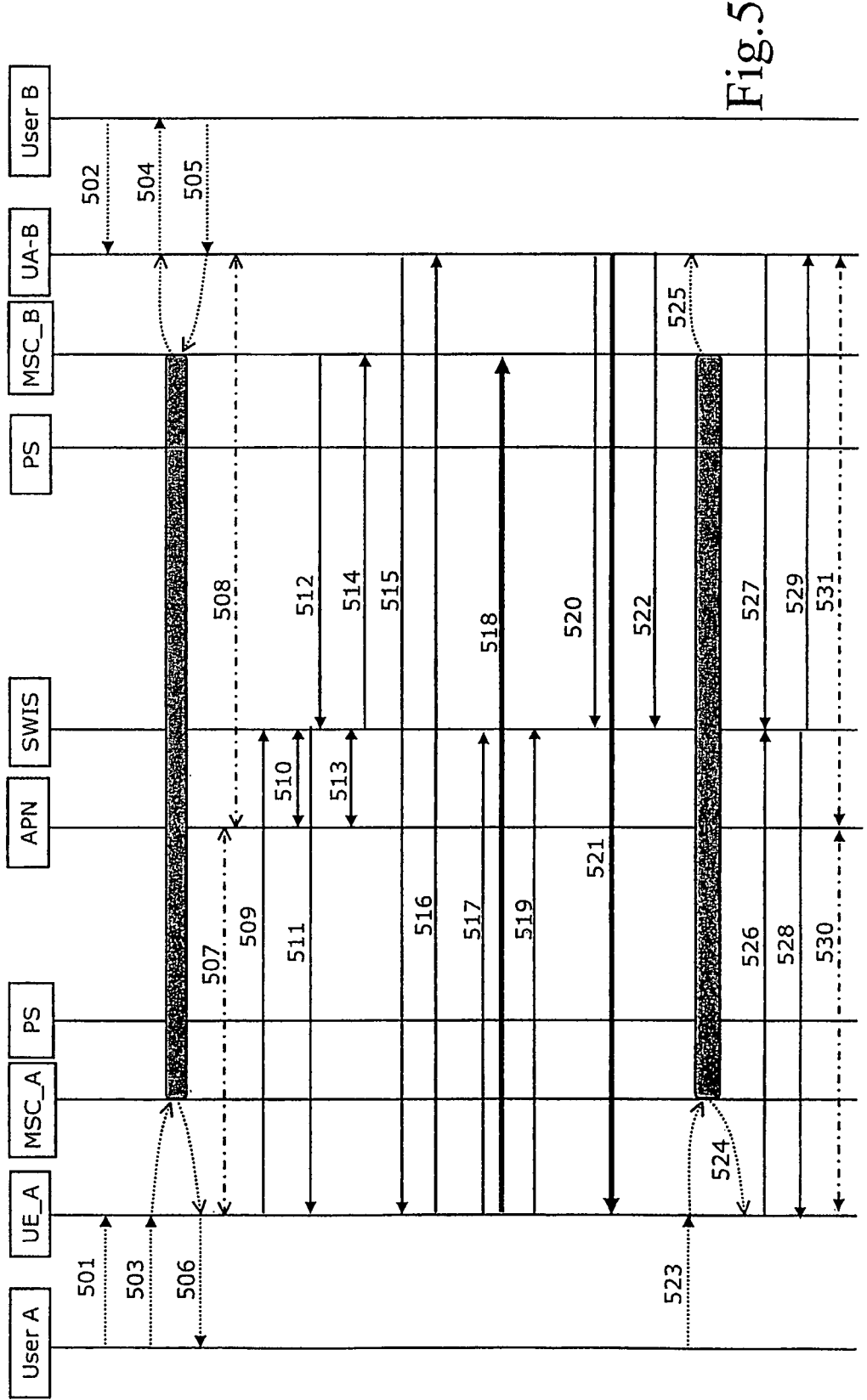
FIG. 5 shows in detail an example of operation flow to enable two users of a mobile communication network to the use of a combinational service of the type "video sharing"

FIG. 5 shows the flow of the different operations performed, in this example, to enable the users User_A and User_B to the use of the service. At the power on of the terminals UE_A and UE_B (501, 502), the users User_A and User_B are registered in the mobile communication network. In addition to such a registration, the terminals UE_A and UE_activate, preferably in automatic way, a software application (hereinafter, "SWIS application") that manages the enablement to the use, as well as the use itself, of the "See What I See" combinational service. The SWIS application is preferably loaded in background on the terminals UE_A and UE_B, in such a way that the management of the SWIS service takes place in transparent way for the users User_A and User_B.

At a certain instant, the user User_A calls the user User_B (503). The call can be started by the user User_A according to any typical modality, for instance the insertion, through the keyboard of the terminal UE_A, of the telephone number of the user User_B or the search of such number in a telephone directory stored on the terminal UE_A or on the SIM associated therewith. The user User_A, typically pressing a suitable key on the keyboard of his/her own terminal UE_A, begins the call to the user User_B. The call is routed by the MSC MSC_A, under which the terminal UE_A is registered, toward the MSC MSC_B, under which the terminal UE_B is registered, and, from there, toward the terminal UE_B. A notification (504) of the incoming call is sent to the terminal UE_B: typically, a message corresponds to such notification, shown on the display of the terminal UE_B of the called user User_B, with the indication of the telephone number of the terminal of the calling user User_A. The user User_B accepts the call (505), typically pressing a suitable key on the keyboard of his/her own terminal UE_B. The acceptance of the call by the user User_B is notified to the terminal UE_A of the user User_A (506) and the call between the terminal UE_A and the terminal UE_B is thus established. The two users User_A and User_B can in this way talk to each other through the connection established in the circuit domain of the mobile communication network. The establishment of the call has been schematized in FIG. 5 through a thick grey line between the MSCs MSC_A, MSC_B.

At the reception of the notification (506) of the acceptance of the call by the user User_B, the SWIS application in execution on the terminal UE_A of the user User_A automatically (i.e., without interaction with the user User_A on the terminal UE_A) activates a connection (507) toward the packet domain of the mobile communication network, parallel to the connection activated on the circuit domain. Typically, the connection toward the packet domain calls for a connection to an access point APN (for instance, a RADIUS server), in which the credentials of the user User_A (i.e., his/her entitlement to the packet services) are checked. If the user User_A is entitled to the packet services, a unique address IP_addA in the packet network is dynamically assigned to his/her terminal UE_A, typically an IP address. In the access point, an association is typically maintained between the telephone number CLI_A of the terminal of the user User_A (or another identifier of the terminal UE_A of the user User_A in the circuit domain) and the IP address IP_addA assigned to the terminal UE_A (or another identifier of the terminal UE_A of the user User_A in the packet domain). Such an association can also be maintained in other apparatuses included in the packet domain of the mobile communication network. Through the packet connection, the terminal UE_A of the user User_A can access the packet network core PS of the mobile communication network and the services made available by it. In a GPRS or UMTS network, this corresponds to the opening of a PDP context from the terminal UE_A toward the packet network PS core.

In a similar way, at the acceptance of the call from the user User_B, the SWIS application in execution on the terminal UE_B of the user User_B automatically (i.e. without interaction with the user User_B on the terminal UE_B) activates a connection (508) toward the packet domain of the mobile communication network, parallel to the connection activated on the circuit domain. Typically, the connection toward the packet domain calls for a connection to an access point APN (for instance a RADIUS server), in which the credentials of the user User_B (or his/her entitlement to the packet services) are checked. The access point APN to which the terminal UE_B is connected can be the same as the access point to which the terminal UE_A is connected, or a different access point. If the user User_B is entitled to the packet services, an unique address IP_addB is dynamically assigned in the packet network to his terminal UE_B, typically an IP address. In the access point an association is typically maintained between the telephone number CLI_B of the user User_B (or another identifier of the terminal UE_B of the user User_B in the circuit domain) and the IP address IP_addB assigned to the terminal UE_B (or another identifier of the terminal UE_B of the user User_B in the packet domain). Such an association can also be maintained in other apparatuses included in the packet domain of the mobile communication network. Through the packet connection, the terminal UE_B of the user User_B can access the packet network PS core of the mobile communication network and the services made available by it. In a GPRS or UMTS network, this corresponds to the opening of a PDP context from the terminal UE_B toward the packet network PS core.

After the reception of the address IP_addA, the SWIS application in execution on the terminal UE_A of the user User_A activates the delivery of a registration request (509) to the SWIS server. The activation of the request takes place in automatic way, so as to result transparent to the user User_A. With the request (509), the terminal UE_A signals to the SWIS server its presence in the packet domain of the mobile network. Advantageously, in the registration application (509) the terminal UE_A can also require the enablement of a connection toward the terminal UE_B, through the packet domain of the mobile communication network, parallel to that already established in the circuit domain. To such end, the terminal UE_A has to know the address of the terminal UE_B in the packet domain, i.e. the address IP_addB. In a preferred implementation, the request sent by the terminal UE_A comprises at least the address assigned to the terminal UE_A in the packet domain (typically the IP address IP_addA) and the identifier of the terminal UE_B in the circuit domain (typically the telephone number CLI_B of the user User_B) with which the user User_A is connected through the call already established on the circuit domain. In a preferred embodiment, the request sent by the terminal UE_A can include one or more TCP or UDP packets carrying the address IP_addA, in which the identifier CLI_B is transported. The SWIS server receives the request coming from the terminal UE_A, and stores in a memory area the address IP_addA of the terminal UE_A and the identifier CLI_B of the user User_B. Through interrogation (510) to a suitable apparatus included in the packet domain of the mobile communication network, for instance the access point APN to which the terminal UE_A is connected (or a WAP Gateway), the SWIS server obtains the identifier CLI_A of the terminal UE_A in the circuit domain of the mobile communication network corresponding to the address IP_addA of the terminal UE_A in the packet domain of the mobile communication network. Such identifier CLI_A is also stored in a memory area by the SWIS server in association with the address IP_addA received through the request sent by the terminal UE_A.

In similar way, after the reception of the address IP_addB, the SWIS application in execution on the terminal UE_B of the user User_B activates the delivery of a request (512) toward the SWIS server enabling and managing the service. The activation of the request takes place in automatic way, so as to result transparent to the user User_B. With the request (512), the terminal UE_B signals to the SWIS server its presence in the packet domain of the mobile network. Advantageously, in the registration request (512) the terminal UE_B can also require the enablement of a connection toward the terminal UE_A, through the packet domain of the mobile communication network, parallel to that already established in the circuit domain. To such purpose, the terminal UE_B has to know the address of the terminal UE_A in the packet domain, i.e. the address IP_addA. In a preferred implementation, the request sent by the terminal UE_B includes at least the address assigned to the terminal UE_B in the packet domain (typically the IP address IP_addB) and the identifier of the terminal UE_A in the circuit domain (typically the telephone number CLI_A of the user User_A) with which the user User_B is connected through the call already established on the circuit domain. In a preferred embodiment, the request sent by the terminal UE_B can include one or more TCP or UDP packets carrying the address IP_addB, in which the identifier CLI_A is transported. The SWIS server receives the request coming from the terminal UE_B, and it stores in a memory area the address IP_addB of the terminal UE_B and the identifier CLI_A of the user User_A. Through interrogation (513) to a suitable apparatus included in the packet domain of the mobile communication network, for instance the access point to which the terminal UE_B is connected (or a WAP gateway), the SWIS server gets the identifier CLI_B of the terminal UE_B in the circuit domain of the communication network mobile correspondent to the address IP_addB of the terminal UE_B in the packet domain of the mobile communication network. Such identifier CLI_B is also stored in memory area by the SWIS server in association with the address IP_addB received through the request sent by the terminal UE_B.

At this point, the SWIS server has the following pieces of information available: the terminal having address IP_addA, corresponding to the identifier CLI_A, asks to connect to the terminal having identifier CLI_B; the terminal having address IP_addB, corresponding to the identifier CLI_B, asks to connect to the terminal having identifier CLI_A. From the matching of these pieces of information, that the SWIS server can store in suitable records of a table, the SWIS server can recognize that the terminals UE_A and UE_B are already connected on the circuit domain, and thus enable a parallel peer-to-peer connection between the two terminals on the packet domain. Such enablement can take place through the exchange, between the terminals UE_A and UE_B, of the addresses IP_addA and IP_addB on the packet domain.

The exchange of the addresses IP_addA and IP_addB between the terminals UE_A and UE_B can be driven by the SWIS server, through the insertion of such addresses in respective of acknowledgment signalings of their previous respective registration request (509, 512), to be sent to one or both of the terminals UE_A, UE_B. In a preferred embodiment, the address of the "interlocutor" terminal in the packet domain is inserted in a signaling of acknowledgment sent to only one terminal. Such acknowledgment can for instance be sent to the terminal UE_B (514), including the address IP_addA of the terminal UE_A, while an "empty" acknowledgment (511) is sent to the terminal UE_A. Upon reception of the acknowledgment (514), the SWIS application in execution on the terminal UE_B extracts the address IP_addA and stores it in a memory area of the terminal UE_B. Additionally, at the extraction of the address IP_addA of the terminal UE_A, the SWIS application in execution on the terminal UE_B replies with the automatic dispatch of a message (515) on the packet domain toward the terminal UE_A, using the related address IP_addA thereof just received, including its own address IP_addB: such a message can be a peer-to-peer message socket type, accomplished through a TCP or UDP packet, that includes a predefined series of characters. The SWIS application in execution on the terminal UE_A extracts from such message the address IP_addB of the terminal UE_B, and stores it in a memory area of the terminal UE_A. Additionally, upon reception of the address IP_addB of the terminal UE_B, the SWIS application in execution on the terminal UE_A automatically activates, typically on the display of the terminal UE_A, a menu option exploitable through a suitable key (or softkey) of the keyboard of the same terminal, through which the user User_A can activate the video camera in incorporated his/her own terminal UE_A and send a video to the terminal UE_B, containing the images taken in real time by the video camera. Moreover, the SWIS application in execution on the terminal UE_A automatically sends an acknowledgment to the terminal UE_B (516) of the occurred reception of the message (515) previously sent by the terminal UE_B. Upon reception of such an acknowledgment (516), the SWIS application in execution on the terminal UE_B automatically activates, typically on the display of the terminal UE_B, a menu option exploitable through a suitable key (or softkey) of the keyboard of the same terminal, through which the user User_B can activate the videocamera incorporated in his/her own terminal UE_B and send a video to the terminal UE_A, containing the images taken in real time by the videocamera.

The terminals UE_A and UE_B of the two users User_A and User_B are, at this point, fully enabled to the use of the SWIS service. Advantageously, the enablement of the two terminals UE_A and UE_B to the combinational SWIS service does not involve any further action by the users User_A and User_B on the terminals UE_A and UE_B, in addition to the normal action of telephone call performed by the user User_A and the normal action of acceptance of such call performed by the user User_B. Such an advantage is in particular achieved thanks to the fact that the requests (509, 512) sent by the terminals UE_A and UE_B toward the SWIS server, for requesting the address on the packet domain of the interlocutor already connected on the circuit domain, are not forwarded by the SWIS server toward the terminals themselves (i.e., the request sent by the terminal UE_A is not forwarded to the terminal UE_B, and vice versa), but they are stopped at the server SWIS. This allows to avoid that an explicit acceptance is made necessary, through an action on the terminals UE_A and UE_B, of the connection also on packet network by the users User_A and User_B for the enablement of the service and for the sending/receiving of the video. Also the activation of the menu options on the terminals UE_A and UE_B takes place in automatic way, thanks to the reception of simple acknowledgment messages coming from the SWIS server. The missing forwarding of the requests sent by the terminals UE_A and UE_B to the SWIS server and the use of acknowledgment messages as a trigger of procedures of activation of the menu options on the terminals UE_A and UE_B allows to significantly reduce the number of signaling messages between the terminals UE_A, UE_B and the SWIS server necessary to enable the SWIS service. This advantageously allows to make the SWIS service available to the users User_A and User_B in an extremely short time.

Referring again to FIG. 5, in case the user User_A wants to start the delivery of a video to the user User_B, he/she presses the key (or softkey) corresponding to the menu option activated on the display of his/her own terminal UE_A. Optionally, the SWIS application in execution on the terminal UE_A automatically sends a notification of "Start Video" (517) toward the SWIS server, for instance to allow the SWIS server to start a counting of the time employed for the delivery of the video sent by the user User_A, for service charging purposes. Additionally, the SWIS application in execution on the terminal UE_A modifies the menu option available on the terminal UE_A, in such a way to make it correspond to an action of stop of the transmission of the video from the user User_A (alternatively, it disables the preceding menu option, and activates an additional one of "stop video", activatable through a different key or softkey). Moreover, the SWIS application in execution on the terminal UE_A activates the capture of images from the video camera of the terminal UE_A, and the related coding adapted to the transmission on the packet connection. Finally, the SWIS application in execution on the terminal UE_A sends the encoded images (518) toward the terminal UE_B (possibly exploiting a buffer), through the connection enabled on the packet domain of the mobile communication network, using its address IP_addB. The user User_A can see the video that he/she is sending to the user User_B on the display of his/her own terminal UE_A. Advantageously, in this phase the SWIS server does not intervene in the communication between UE_A and UE_B. This allows to manage the SWIS service for a high number of users also with an apparatus of rather limited processing capability, inasmuch such an apparatus only has to manage simple signaling messages, and not complex streams of data. Upon reception of the video (possibly performed by the terminal UE_B exploiting a buffer), the user User_B can see it on the display of his/her own terminal UE_B. The SWIS application in execution on the terminal UE_B preferably disables the menu option of delivery of video on the terminal UE_B, so as to avoid collisions on the connection established on the packet domain of the mobile communication network. When the user User_A decides to stop the delivery of the video, he/she presses the key (or softkey) of stop video just made available on the display of the terminal UE_A: the SWIS application in execution on the terminal UE_A stops the capture of images from the videocamera and the transmission of the encoded images toward the terminal UE_B. Optionally, the SWIS application in execution on the terminal UE_A automatically sends a notification of "Stop Video" (519) toward the SWIS server, for instance to allow the SWIS server stop the counting of the time employed for the transmission of the video sent by the user User_A, for service charging purposes.

Likewise, in the case the user User_B wants to start the transmission of a video toward the user User_A, he/she presses the key (or softkey) corresponding to the menu option activated on the display of his/her own terminal UE_B. Optionally, the SWIS application in execution on the terminal UE_B automatically sends a notification of "Start Video" (520) toward the SWIS server, for instance to allow the SWIS server start a counting of the time employed for the transmission of the video sent by the user User_B, for service charging purposes. Additionally, the SWIS application in execution on the terminal UE_B modifies the menu option available on the terminal UE_B, in such a way to make it correspond to an action of stop of the transmission of the video from the user User_B (alternatively, it disables the preceding menu option, and activates an additional one of "stop video", activatable through a different key or softkey). Moreover, the SWIS application in execution on the terminal UE_B activates the capture of images by the videocamera of the terminal UE_B, and the related coding adapted to the transmission on the packet connection. Finally, the SWIS application in execution on the terminal UE_B sends the encoded images (521) toward the terminal UE_A (possibly exploiting a buffer), through the connection enabled on the packet domain of the mobile communication network using its address IP_addA. The user User_B can see the video that he/she is sending to the user User_A on the display of his/her own terminal UE_B. Advantageously, in this phase the SWIS server does not intervene in the communication between UE_B and UE_A. Upon reception of the video (possibly performed by the terminal UE_A exploiting a buffer), the user User_A can see it on the display of his/her own terminal UE_A. The SWIS application in execution on the terminal UE_A preferably disables the menu option of video transmission on the terminal UE_A, so as to avoid collisions on the connection established on the packet domain of the mobile communication network. When the user User_B decides to stop the transmission of the video, he/she presses the key (or softkey) of stop video just made available on the display of the terminal UE_B: the SWIS application in execution on the terminal UE_B stops the capture of images by the videocamera and the transmission of the encoded images toward the terminal UE_A. Optionally, the SWIS application in execution on the terminal UE_B automatically sends a notification of "Stop Video" (522)

toward the SWIS server, for instance to allow the SWIS server stop the counting of the time employed for the transmission of the video sent by the user User_B, for service charging purposes.

In the case one of the two users, for instance the user User_A, wants to terminate the communication with the user User_B, he/she typically presses the suitable key on the keyboard of his/her own terminal UE_A, thus notifying (523) to the mobile communication network (on the circuit domain) his/her own intention to terminate the call. The SWIS application in execution on the terminal UE_A intercepts (524) such a notification and sends to the SWIS server a signaling of terminated exploitation of the service (526). The terminal UE_B of the other user User_B is notified (525) of the termination of the call on the circuit domain. The SWIS application in execution on the terminal UE_B intercepts such a notification and sends to the SWIS server a signaling of terminated exploitation of the service (527). The SWIS server may reply to the signalings coming from the terminals UE_A and UE_B with an acknowledgment (528, 529). Upon reception of such an acknowledgment, the SWIS applications in execution on the terminals UE_A and UE_B can thus command the de-activation of the connections of the terminals UE_A and UE_B on the packet domain (530, 531), and the release of the addresses IP_addA and IP_addB. The termination of the call between the terminals UE_A and UE_B in the circuit domain has been indicated in FIG. 5 by means of another thick grey line.

The above description has made reference to a situation in which the terminals UE_A and UE_B were both capable of supporting the combinational service. In case a call is performed by a terminal (for instance UE_A) capable of supporting the combinational service to a terminal not capable of supporting the combinational service, the SWIS application in execution on the terminal UE_A automatically activates the connection toward the packet domain, it receives its own address IP_addA, and sends the registration request to the SWIS server. Such a procedure can advantageously be disabled in case the ongoing call is effected toward particular numerations, as already illustrated in the foregoing. In any case, if within a predetermined timeout (typically configurable) the terminal UE_A does not receive an IP address in an acknowledgment to its registration request or in a socket peer-to-peer, the SWIS application can automatically command the disconnection from the packet domain, so as to quickly release the IP address uselessly "wasted". In case a call is received by a terminal (for instance UE_B) capable of supporting the combinational service, coming from a terminal not capable of supporting the combinational service, the SWIS application in execution on the terminal UE_B automatically activates the connection toward the packet domain, it receives its own address IP_addB, and it sends the registration request to the SWIS server. Such a procedure can advantageously be disabled in case the ongoing call originates from particular numerations, as already illustrated in the foregoing. In any case, if within a predetermined timeout (typically configurable) the terminal UE_B does not receive an IP address in an acknowledgment of its registration request or in a socket peer-to-peer, the SWIS application can automatically command the disconnection from the packet domain, so as to quickly release the IP address uselessly "wasted". Similar timeouts can also be implemented for managing possible problems in the establishment of the packet connection. The duration of these timeouts can be configured by the server through suitable fields in the answer message to the registration request or through typical operations over-the-air.

In a preferred version, it can be envisaged that the terminals UE_A and UE_B exchange messages of notification and acknowledgment for avoiding situations of simultaneous transmission of video from both the terminals. For instance, as shown in FIG. 6a, after the selection of the menu option related to the transmission of the video from the user User_A on his/her own terminal UE_A, the SWIS application in execution on the terminal UE_A automatically sends a notification message (indicated as INVITE in FIG. 6a) to the terminal UE_B. Upon reception of the notification message, the SWIS application in execution on the terminal UE_B sets up for the reception of the video and automatically sends an acknowledgment message (indicated as ACK in FIG. 6a) to the terminal UE_A. Upon reception of the acknowledgment, the SWIS application in execution on the terminal UE_A starts transmitting the video.

Figure 6B:
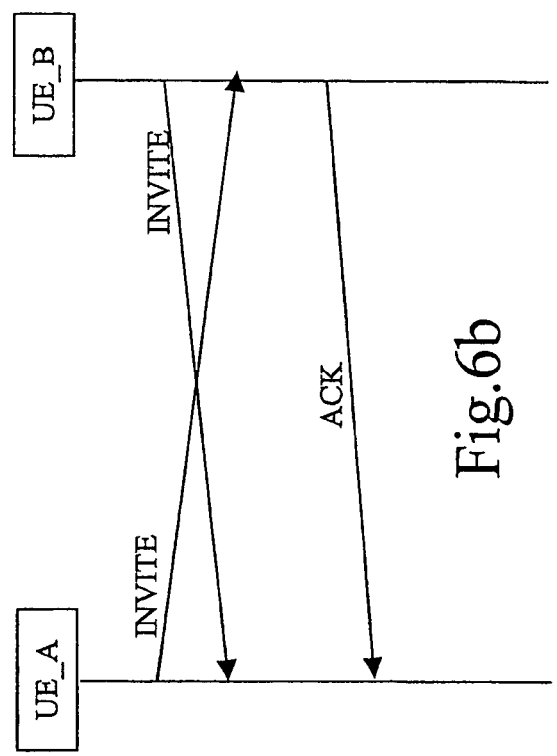
FIG. 6a and FIG. 6b show two possible procedures between two terminals in peer-to-peer connection, to avoid transmission collisions on the connection.
Figure 6A:
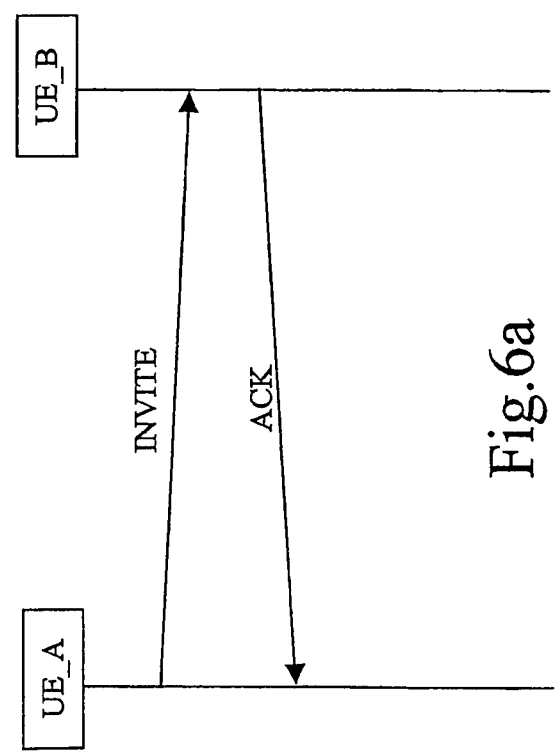

In the case of "simultaneous" dispatch of the notification messages from the terminals UE_A and UE_B, as for instance shown in FIG. 6b, the implementation of a priority policy protocol can be envisaged. For instance, such a policy can provide that the priority goes, in these cases, to the terminal that has originated the call in the circuit domain. Other policies can be alternatively selected. In the example cited above, UE_A was the terminal that had originated the call on the circuit domain. As shown in FIG. 6b, in the case UE_B has simultaneously sent its own notification message to UE_A, UE_B receives a notification message from UE_A in place of an acknowledgment of its own notification message. In such a case, the SWIS application in execution on the terminal UE_B, following the priority policy, sends the acknowledgment to the notification message coming from UE_A.

In a further preferred version, the use of a session identifier can be added to the functionalities previously described, assigned by the SWIS server to the terminals UE_A, UE_B, to identify the peer-to-peer connection between the two terminals. Such a session identifier allows making the communication protocol more robust, and, as it will be pointed out in the following description, it also allows to simplify the structure of at least some of the messages, so that the procedure of enablement of the combinational service is made more efficient and faster. In detail, the procedure previously illustrated can be modified in such a way to distinguish two different typologies of registration request from the terminals UE_A, UE_B at the SWIS server: a first registration (for instance performed by the SWIS application at the first call performed or received by the related terminal after the switch-on), a registration subsequent to the first. The two different typologies of registration request are distinguished for the fact that in the first registration request the SWIS application does not send to the SWIS server the session identifier (henceforth SessionID), while in the registration request following the first one the SWIS application inserts a SessionID previously received by the SWIS server.

More particularly, with reference to the terminal UE_A, at the first registration at the SWIS server the terminal UE_A sends to the SWIS server a registration request after having opened the connection on the packet domain, including in the request its own address IP_addA and the telephone number CLI_B of the terminal UE_B, as previously described. Further parameters, for instance parameters related to the configuration of the video coding set on the terminal UE_A, and/or to the version of the SWIS application, and/or the address of the APN to which the terminal UE_A is connected for opening the packet connection, can be included in the first registration request, as it will be pointed out more in detail in the following description. In the first registration request, the parameter SessionID is not included, because the SWIS server has not yet communicated it to the terminal UE_A.

The SWIS server receives the registration request from the terminal UE_A, extracts its address IP_addA, and recognizes the absence of the parameter SessionID. Based on this, it asks the APN to get the telephone number CLI_A of the terminal UE_A. Once the telephone number CLI_A has been obtained, the SWIS server generates the session identifier SessionID. Such an identifier can for instance be formed by a random sequence of numbers or alphanumeric characters. In a preferred embodiment, the SWIS server generates a key ID, with which it encrypts the telephone number CLI_A. From the key ID and from the telephone number CLI_A encrypted with such a key, the SWIS server generates the session identifier of SessionID, for instance:

$$SessionID = (CLI\_A)_{ID} + [ID]_x$$

where the notation $(CLI\_A)_{ID}$ indicates the telephone number CLI_A encrypted by means of the key ID and the notation $[ID]_x$ indicates that the key ID is not in plaintext but is preferably ciphered by the SWIS server with the same algorithm used for ciphering CLI_A (or with a different algorithm) and with a key X known only to the SWIS server. The parameter SessionID thus produced is sent by the SWIS server to the terminal UE_A, in a message of acknowledgment to its preceding registration request. In such message of acknowledgement, the SWIS server can additionally include other information, such as for instance possible modifications to the setting parameters of the video coding of the terminal UE_A. The same session identifier SessionID is also communicated to the terminal UE_B, in a message of acknowledgement of its registration request, once the SWIS server has verified that the terminals UE_A and UE_B already have an ongoing call in the circuit domain. Such parameter SessionID can advantageously be included in the messages that the terminals UE_A and UE_B exchange once the peer-to-peer connection in the packet domain is established, to make the communication protocol more robust thanks to coherence cross controls.

In the registration requests subsequent to the first one, the terminal. UE_A sends its own address IP_addA, the telephone number of the interlocutor on the circuit domain (for instance the same terminal UE_B or a third terminal UE_C), and the parameter SessionID received by the SWIS server in the registration preceding the current one. Preferably, in such a request the terminal UE_A does not send anymore to the SWIS server the additional parameters previously described. The SWIS server is able to extract the telephone number CLI_A of the terminal UE_A that is sending the registration request from the parameter SessionID included in the registration request (decrypting it by means of the key ID related to the preceding registration request), without the necessity of interrogating again the APN for "resolving" the address IP_addA. This allows to speed up the procedure of enablement of the combinational service, as well as to reduce the processing load on the access nodes APN of the packet domain. The session identifier SessionID expires at the closing of the peer-to-peer connection between the two terminals, that is signaled by the same terminals to the SWIS server, as previously described.

In the following examples, possible compositions of some of the signaling messages previously described are reported. The compositions typically refer to fields to be inserted in the various messages. Hereinbelow the exhaustive list is given of the fields present in all the examples reported in the following, with the related explanation:

Command: indicates the performed command (in the messages in which the beginning of a procedure is signaled);

Version: indicates the version of the SWIS application installed on the terminal;

Type: indicates the type of terminal;

Remote IP: indicates the IP of the recipient;

Remote MSISDN: indicates the telephone number of the recipient;

APN: indicates the APN used for the connection on packet domain;

Bitrate: indicates the speed of the video transmission used by the video encoder on the terminal;

Framerate: indicates the number of video frames in the unit of time used by the video encoder on the terminal;

Timeout: indicates the waiting time of a starting message of peer-to-peer session;

Session-ID: indicates the peer-to-peer session;

SizeDisplay: indicates the size of the screen;

RFU: indicates a field reserved to possible future uses.

In all the examples reported below, it is intended that the signalings are transported by TCP or UDP packets, already carrying the IP address assigned to the sender terminal: for this reason, such an address is never indicated among the fields to be inserted.

In a first example (table 1), a possible structure of a message of first registration request from a terminal to the SWIS server is reported.

TABLE 1

| FIELDS | Value | | |
|---|---|---|---|
| | Mandatory | Optional | Missing |
| Command | X | | |
| Version | X | | |
| Type | X | | |
| Remote MSISDN | X | | |
| Session-ID | | | X |
| APN | X | | |
| Bitrate | X | | |
| Framerate | X | | |
| Timeout | X | | |
| SizeDisplay | | X | |
| RFU | | X | |

In a second example (table 2), a possible structure of a message of registration request following to the first one from a terminal to the SWIS server is reported.

TABLE 2

| FIELDS | Value | | |
|---|---|---|---|
| | Mandatory | Optional | Missing |
| Command | X | | |
| Version | X | | |
| Type | X | | |
| Remote MSISDN | X | | |
| Session-ID | X | | |
| APN | | | X |
| Bitrate | | | X |
| Framerate | | | X |
| Timeout | | | X |
| SizeDisplay | | X | |
| RFU | | X | |

In a third example (table 3), a possible structure of a message of acknowledgment sent by the SWIS server to a terminal that has sent a first registration request is reported.

TABLE 3

| FIELDS | Value | | |
|---|---|---|---|
| | Mandatory | Optional | Missing |
| Remote IP | X (if present) | | |
| Version | X (if present) | | |
| Type | X (if present) | | |
| Session-ID | X | | |
| APN | | X (if changed) | |
| Bitrate | | X (if changed) | |
| Framerate | | X (if changed) | |
| Timeout | | X (if changed) | |
| SizeDisplay | | | |
| RFU | | X | |

In a fourth example (table 4), a possible structure of a message of acknowledgment sent by the SWIS server to a terminal that has sent a registration request following the first one is reported.

TABLE 4

| FIELDS | Value | | |
|---|---|---|---|
| | Mandatory | Optional | Missing |
| Remote IP | X (if present) | | |
| Version | X (if present) | | |
| Type | X (if present) | | |
| Session-ID | X | | |
| APN | | | X |
| Bitrate | | | X |
| Framerate | | | X |
| Timeout | | | X |
| SizeDisplay | | | |
| RFU | | X | |

In a fifth example (table 5), a possible structure of a message of signaling of closing of the peer-to-peer connection sent by the terminals to the SWIS server is reported.

TABLE 5

| FIELDS | Value | | |
|---|---|---|---|
| | Mandatory | Optional | Missing |
| Command | X | | |
| Session-ID | X | | |
| RFU | | X | |

In a sixth example (table 6), a possible structure of a message of peer-to-peer session start, sent by one of the two terminals to the other is reported.

TABLE 6

| FIELDS | Value | | |
|---|---|---|---|
| | Mandatory | Optional | Missing |
| Session-ID | X | | |
| RFU | | X | |

In a seventh example (table 7), a possible structure of a message of signaling of start of video transmission, sent by one of the terminals to the SWIS server is reported.

TABLE 7

| FIELDS | Value | | |
|---|---|---|---|
| | Mandatory | Optional | Missing |
| Command | X | | |
| Session-ID | X | | |
| RFU | | X | |

In an eighth example (table 8), a possible structure of a message of signaling of end of video transmission, sent by one of the terminals to the SWIS server is reported.

TABLE 8

| FIELDS | Value | | |
|---|---|---|---|
| | Mandatory | Optional | Missing |
| Command | X | | |
| Session-ID | X | | |
| RFU | | X | |

Such signaling messages can be produced through known protocols, such as for instance HTTP and SIP. The signaling messages can be sent in ciphered way (through suitable keys) or, preferably, encoded (for instance by means of Base64 or Huffman coding), to increase the level of privacy of the communication protocol.

The present description has been carried out with specific reference to a mobile communication network. The Applicant believes however that the teachings given above can be applied or be adapted also for services enjoyable by a fixed network. Particularly it can be provided that the terminals of two users connected to each other in a call, and capable of enjoying a combinational service, are connected one to a fixed network, one to a mobile network.

The invention claimed is:

1. A method of enabling the use of at least one combinational service in at least a first terminal of a first user of a communication network, the communication network comprising a server configured to communicate with the first terminal and a second terminal, comprising:
   establishing a first connection in a circuit domain of said communication network from said first terminal to said second terminal of a second user of said communication network;
   receiving at said first terminal, an acknowledgement of the establishing of said first connection;
   automatically connecting said first terminal with a packet domain of said communication network in consequence of the reception of said acknowledgement;
   receiving from the server a first address of said first terminal in said packet domain of said communication network, said first address being associated with a first identifier of said first terminal in said circuit domain of said communication network;
   in consequence of the reception of said first address from the server, automatically sending a first request from said first terminal to an apparatus included in said packet domain of said communication network for a second address of said second terminal in said packet domain of said communication network, said first request including one or more packets for establishing a second connection in said packet domain of said communication network between said first terminal and said second terminal, comprising:
   the first address; and a second identifier associated with said second terminal in said circuit domain of said communication network;

receiving a peer-to-peer message from the second terminal containing the first address and the second address, the peer-to-peer message being a packet message in response to the first request;

engaging in the second connection in said packet domain of said communication network with said second terminal, said second connection being a peer-to-peer connection based on a first association between said first identifier and said first address and of a second association between said second identifier and said second address; and in response to receiving said peer-to-peer message from the second terminal, automatically activating on said first terminal at least one menu option related to at least one service viewable through said second connection after the establishment of said second connection, wherein said at least one menu option is activatable on said first terminal by said first user.

2. The method according to claim 1, wherein said request comprises an identifier of said second terminal in said circuit domain of said communication network.

3. The method according to claim 1, wherein said activation of said at least one menu option on said first terminal occurs within a predefined time interval from the sending of said request of address of said second terminal.

4. The method according to claim 1, wherein said at least one menu option allows the transmission of a video from said first terminal to said second terminal through said second connection.

5. The method according to claim 1, further comprising:
terminating said first connection;
receiving at said first terminal, an acknowledgement of the termination of said first connection; and
automatically terminating said second connection in consequence of the reception of said acknowledgement of the termination of said first connection.

6. A non-transitory computer-readable medium adapted to be installed on a first terminal of a first user of a communication network, the communication network comprising a server configured to communicate with the first terminal and a second terminal, to enable the use of at least one combinational service in said first terminal, comprising instructions that when executed by said first terminal cause the first terminal to:
establish a first connection in a circuit domain of said communication network from said first terminal to said second terminal of a second user of said communication network;
receive an acknowledgement related to the establishment of said first connection;
automatically connect said first terminal with a packet domain of said communication network in consequence of the reception of said acknowledgement;
receive from the server a first address of said first terminal in said packet domain of said communication network, said first address being associated with a first identifier of said first terminal in said circuit domain of said communication network;
in consequence of the reception of said first address from the server, automatically send a first request from said first terminal to an apparatus included in said packet domain of said communication network for a second address of said second terminal in said packet domain of said communication network, said first request including one or more packets for establishing a second connection in said packet domain of said communication network between said first terminal and said second terminal, comprising:
the first address; and
a second identifier associated with said second terminal in said circuit domain of said communication network;

receive a peer-to-peer message from the second terminal containing the first address and the second address, the peer-to-peer message being a packet message in response to the first request;

engage in the second connection in said packet domain of said communication network with said second terminal, said second connection being a peer-to-peer connection based on a first association between said first identifier and said first address and of a second association between said second identifier and said second address; and in response to receiving said peer-to-peer message from the second terminal, automatically activate on said first terminal at least one menu option related to at least one service viewable through said second connection after the establishment of said second connection, wherein said at least one menu option is activatable on said first terminal by said first user.

7. The non-transitory computer-readable medium according to claim 6, wherein said request comprises an identifier of said second terminal in said circuit domain of said communication network.

8. The non-transitory computer-readable medium according to claim 6, further comprising instructions that when executed, causes the first terminal to:
activate said at least one menu option in consequence of the reception of said address of said second terminal.

9. The non-transitory computer-readable medium according to claim 8, wherein said instructions that causes the first terminal to activate said at least one menu option causes the first terminal to activate said menu option within a predefined time interval from the sending of said request of address of said second terminal.

10. The non-transitory computer-readable medium according to claim 8, wherein said at least one menu option is adapted to allow the transmission of a video from said first terminal to aid second terminal through said second connection.

11. The non-transitory computer-readable medium according to claim 6, further comprising instructions that when executed cause the first terminal to:
receive an acknowledgement related to the termination of said first connection; and
automatically terminate said second connection in consequence of the reception of said acknowledgement of the termination of said first connection.

12. A first terminal adapted for a mobile communication network comprising a server configured to communicate with the first terminal and a second terminal, the first terminal comprising a processor configured to execute instructions in the first terminal adapted to:
receive an acknowledgement related to the establishment of a first connection in a circuit domain of said communication network from a first terminal to said second terminal of a second user of said communication network;

automatically establish a second connection from said first terminal toward a packet domain of said communication network in consequence of the reception of said acknowledgement;

receive from the server a first address of said first terminal in said packet domain of said communication network, said first address being associated with a first identifier of said first terminal in said circuit domain of said communication network;

in consequence of the reception of said first address from the server, automatically send a first request from said first terminal to an apparatus included in said packet domain of said communication network for a second address of said second terminal in said packet domain, said first request including one or more packets for establishing a second connection in said packet domain of said communication network between said first terminal and said second terminal, comprising:
the first address; and
a second identifier associated with said second terminal in said circuit domain of said communication network;

receive a peer-to-peer message from the second terminal containing the first address and the second address, the peer-to-peer message being a packet message in response to the first request;

engage in the second connection in said packet domain of said communication network with said second terminal, said second connection being a peer-to-peer connection based on a first association between said first identifier and said first address and of a second association between said second identifier and said second address; and in response to receiving said peer-to-peer message from the second terminal, automatically activate on said first terminal at least one menu option related to at least one service viewable through said second connection after the establishment of said second connection, wherein said at least one menu option is activatable on said first terminal by said first user.

13. A method for enabling a first and a second terminal of a communication network to the use of a combinational service, said first and said second terminal being connected to each other through a first connection established on a circuit domain of said communication network, said first and said second terminal having respectively associated therewith a first and a second identifier in said circuit domain of said communication network, said first and said second terminal having respectively associated therewith a first and a second address in a packet domain of said communication network, comprising, in a first apparatus in said packet domain of said communication network:

receiving from said first terminal a first request of the second address of said second terminal in said packet domain of said communication network, said first request including one or more packets for establishing a second connection in said packet domain of said communication network between said first terminal and said second terminal, comprising:
the first address; and
the second identifier associated with said second terminal in said circuit domain of said communication network;

associating said first address of the packet domain with said first identifier of the circuit domain for said first terminal;

receiving from said second terminal a second request of the first address of said first terminal in said packet domain of said communication network, said second request comprising said second address and said first identifier;

associating said second address of the packet domain to said second identifier of the circuit domain for said second terminal;

enabling the establishment of the second connection on said packet domain of said communication network between said first and said second terminals based on said association between said first address and said first identifier and on said association between said second address and said second identifier, wherein said second connection is a peer-to-peer connection, and said first and second associations being performed by said first apparatus in consequence of the reception of said first and second requests; and in response to receiving said second request from the second terminal, automatically activating on said first terminal at least one menu option related to at least one service viewable through said second connection after the establishment of said second connection, wherein said at least one menu option is activatable on said first terminal.

14. The method according to claim 13, wherein associating said first address with said first identifier or associating said second address with said second identifier comprises:
sending a request of said first or said second identifier to a second apparatus in said packet domain of said communication network, said request of said first or said second identifier comprising said first or, respectively, said second addresses; and
receiving said first or said second identifier from said second apparatus.

15. The method according to claim 13, wherein said enabling the establishment of said second connection comprises:
sending said first or said second address, respectively, to said second or to said first terminal.

16. The method according to claim 14, wherein said second apparatus comprises an access node to said packet domain of said communication network.

17. The method according to claim 13, wherein said first or said second address comprises a first or a second IP address assigned to said first or to said second terminal.

18. The method according to claim 13, wherein said first or said second identifier comprises a first or a second telephone number of said first or said second terminal.

19. The method according to claim 13, wherein said first or said second request by said first or said second terminal comprises a first or a second TCP packet.

20. A non-transitory computer-readable medium adapted to be installed in a first apparatus in a packet domain of a communication network, configured to, when executed, enable a first and a second terminal of said communication network to the use of a combinational service, said first and said second terminal being connected to each other through a first connection established on a circuit domain of said communication network, said first and said second terminal having respectively associated therewith a first and a second identifier in said circuit domain of said communication network, said first and said second terminal having respectively associated therewith a first and a second address in said packet domain of said communication network, comprising instructions that when executed cause the first apparatus to:
receive from said first terminal a first request of the second address of said second terminal in said packet domain of said communication network, said first request comprising one or more packets for establishing a second connection in said packet domain of said communication network between said first terminal and said second terminal, including said first address and said second identifier;

associate said first address of the packet domain with said first identifier of the circuit domain for said first terminal;

receive from said second terminal a second request of the first address of said first terminal in said packet domain of said communication network, said second request comprising said second address and said first identifier;

associate said second address of the packet domain with said second identifier of the circuit domain for said second terminal;

enable the establishment of the second connection on said packet domain of said communication network between said first and said second terminal being a peer-to-peer connection based on said association between said first address and said first identifier and on said association between said second address and said second identifier wherein said second connection is a peer-to-peer connection, said first and second associations being performed by said first apparatus in consequence of the reception of said first and second requests; and in response to receiving said second request from the second terminal, automatically activate on said first terminal at least one menu option related to at least one service viewable through said second connection after the establishment of said second connection, wherein said at least one menu option is activatable on said first terminal.

21. The non-transitory computer-readable medium according to claim 20, wherein said instructions adapted to associate said first address with said first identifier or to associate said second address with said second identifier comprises further instructions adapted to:

send a request of said first or said second identifier to a second apparatus in said packet domain of said communication network, said request of said first or said second identifier comprising said first, or, respectively, said second address; and receive said first or said second identifier from said second apparatus.

22. The non-transitory computer-readable medium according to claim 20, wherein said instructions adapted to enable the establishment of said second connection further comprises instructions adapted to:

send said first or said second address respectively to said second or to said first terminal.

23. The non-transitory computer-readable medium according to claim 21, wherein said second apparatus comprises an access node to said packet domain of said communication network.

24. The non-transitory computer-readable medium according to claim 20, wherein said first or said second address comprises a first or a second IP address assigned to said first or to said second terminal.

25. The non-transitory computer-readable medium according to claim 20, wherein said first or said second identifier comprises a first or a second telephone number of said first or said second terminal.

26. The non-transitory computer-readable medium according to claim 20, wherein said first or said second request by said first or said second terminal comprises a first or a second TCP packet.

27. A method for enabling a first and a second terminal of a communication network to the use of a combinational service, the communication network comprising a server configured to communicate with the first terminal and a second terminal, comprising:

establishing a first connection in a circuit domain of said communication network between said first terminal and said second terminal;

sending to said first and said second terminal, an acknowledgement of the establishment of said first connection;

connecting said first and said second terminal to a packet domain of said communication network;

assigning to said first and said second terminal respectively a first and a second address in said packet domain of said communication network, said first and said second address being respectively associated with a first and a second identifier of said first and said second terminals in said circuit domain of said communication network;

receiving a first request from said first terminal to an apparatus in said packet domain of said communication network for the second address of said second terminal in said packet domain of said communication network, said first request including one or more packets for establishing a second connection in said packet domain of said communication network between said first terminal and said second terminal, comprising:
   the first address; and
   the second identifier in consequence of the reception of said first address by the first terminal;

receiving a second request from said second terminal to said apparatus for the first address of said first terminal in said packet domain of said communication network, said second request comprising said second address and said first identifier in consequence of the reception of said second address by the second terminal;

enabling the establishment of the second connection on said packet domain of said communication network between said first and said second terminal, said second connection being a peer-to-peer connection based on a first association between said first identifier and said first address and on a second association between said second identifier and said second address, said first and said second associations being performed by said apparatus in consequence of the reception of said first and said second request; and in response to receiving said second request from the second terminal, automatically activating on said first terminal at least one menu option related to at least one service viewable through said second connection after the establishment of said second connection, wherein said at least one menu option is activatable on said first terminal.

28. The method according to claim 27, wherein said enabling the establishment of said second connection comprises:

sending from said apparatus, said first address to said second terminal.

29. The method according to claim 27, wherein said first or said second address comprises a first or a second IP address assigned to said first or to said second terminal.

30. The method according to claim 27, wherein said first or said second identifier comprises a first or a second telephone number of said first or said second terminal.

31. The method according to claim 27, wherein said first or said second request by said first or said second terminal comprises a first or a second TCP packet.

32. The method according to claim 27, further comprising:
terminating said first connection;
sending to said first and at said second terminal, an acknowledgement of the termination of said first connection; and
automatically terminating said connection of said first and said second terminal to said packet domain of said communication network in consequence of the reception of said acknowledgement of the termination of said first connection.

* * * * *